Figure 5:
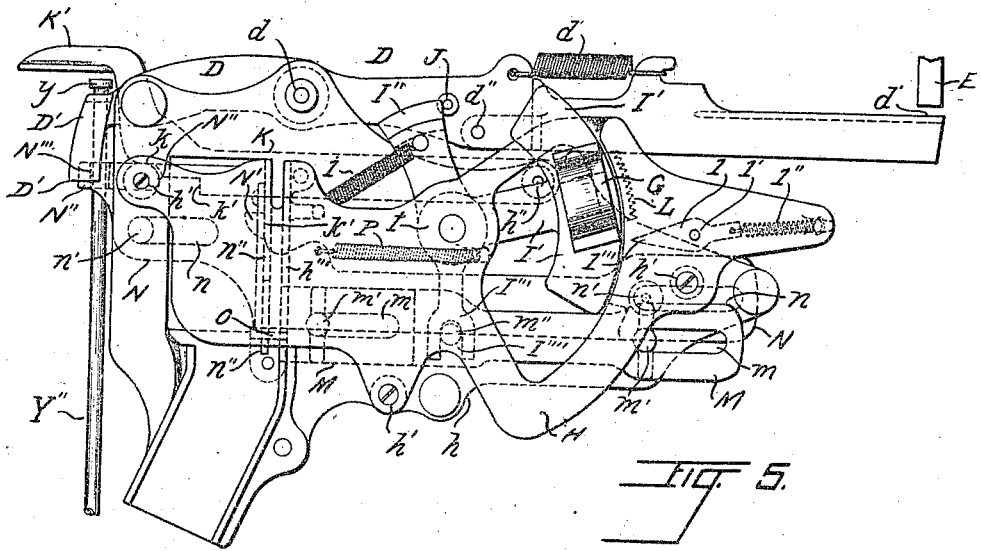

J. PAUPA & G. F. HOCHRIEM.
COIN CONTROLLED MECHANISM FOR BEAM SCALES.
APPLICATION FILED FEB. 27, 1911.
1,043,352.
Patented Nov. 5, 1912.
3 SHEETS—SHEET 1.
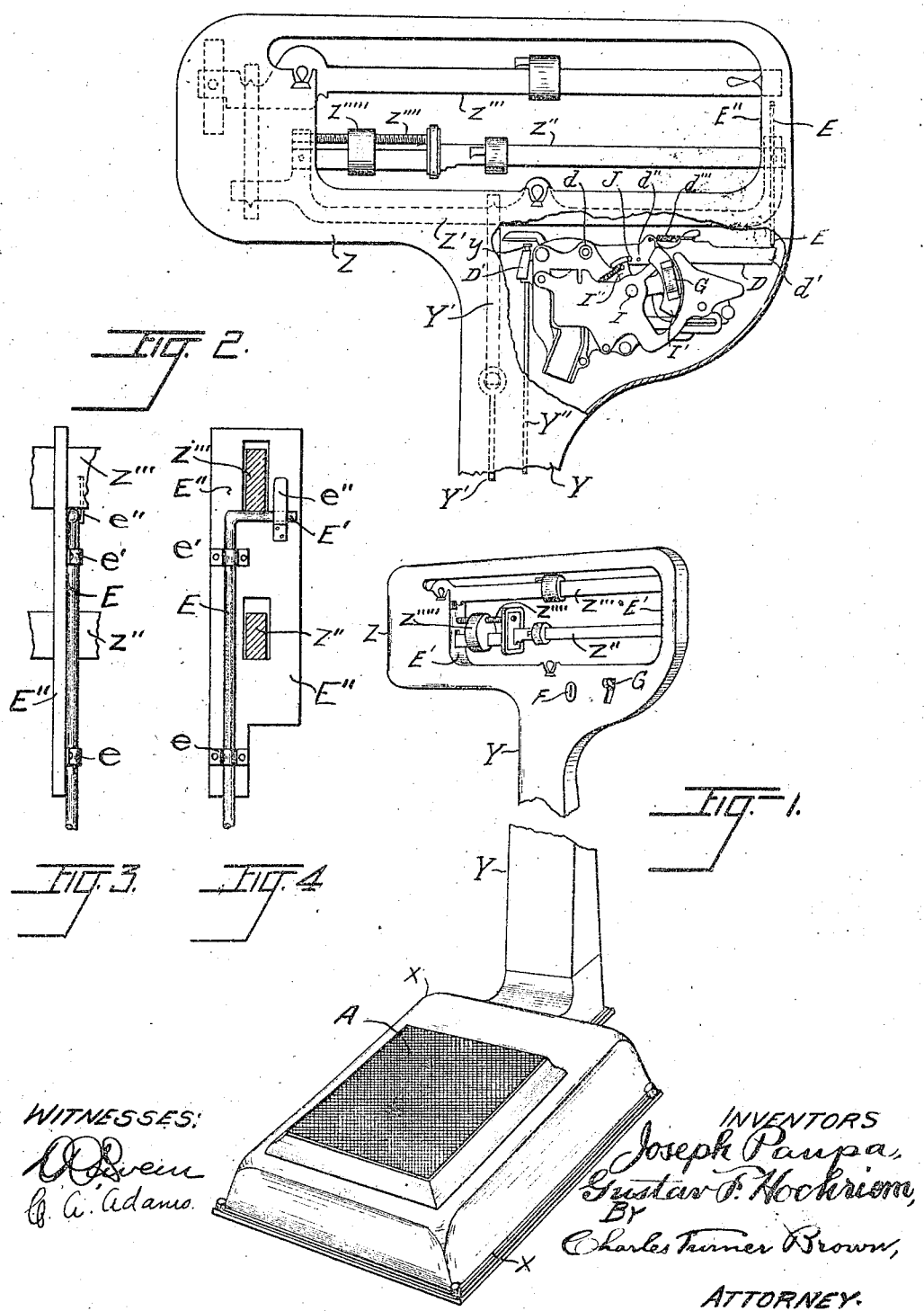

J. PAUPA & G. F. HOCHRIEM.
COIN CONTROLLED MECHANISM FOR BEAM SCALES.
APPLICATION FILED FEB. 27, 1911.

1,043,352.

Patented Nov. 5, 1912.

3 SHEETS—SHEET 2.

WITNESSES:

INVENTORS
Joseph Paupa,
Gustav F. Hochriem,
BY
Charles Turner Brown,
ATTORNEY.

J. PAUPA & G. F. HOCHRIEM.
COIN CONTROLLED MECHANISM FOR BEAM SCALES.
APPLICATION FILED FEB. 27, 1911.

1,043,352.

Patented Nov. 5, 1912.

3 SHEETS—SHEET 3.

WITNESSES:

INVENTORS
Joseph Paupa
Gustav F. Hochriem,
BY Charles Turner Brown,
ATTORNEY.

UNITED STATES PATENT OFFICE.

JOSEPH PAUPA AND GUSTAV F. HOCHRIEM, OF CHICAGO, ILLINOIS.

COIN-CONTROLLED MECHANISM FOR BEAM-SCALES.

1,043,352.

Specification of Letters Patent.

Patented Nov. 5, 1912.

Application filed February 27, 1911. Serial No. 611,051.

*To all whom it may concern:*

Be it known that we, JOSEPH PAUPA and GUSTAV F. HOCHRIEM, citizens of the United States, and residing at Chicago, in the county of Cook and State of Illinois, have invented certain new and useful Improvements in Coin-Controlled Mechanism for Beam-Scales, of which the following is a specification.

This invention relates to coin controlled mechanisms which are joined to weighing scales in such manner that certain determined operations and the deposit of a coin are requisite before a record or register can be obtained of the weight of a person or thing on said scales.

The object of this invention is to obtain a coin controlled mechanism which is not liable to get out of order and which may be attached or joined to scales which are provided with weighing beams, having sliding weights thereon, in such manner that no record or register of the weight of a person or thing on the platform of the scales is obtainable until a coin has been deposited in the place provided therefor and certain prescribed operations have thereafter been completed.

A further object of the invention is to obtain a device of the kind described which will not interfere with the operation of the scales or affect the accuracy of the weighing accomplished by the scales.

A further object is to obtain a device of the character described which will not of itself tend to get said scales out of order and will not permit said scales to be gotten out of order because of or during the operation or partial operation of said device. And a further object is to obtain a device which is necessarily operated, (by the person using the scales), in the prescribed manner before a register or record can be obtained from said scales, and a device which will prevent the use of the scales for successively weighing more than one person or object on the deposit of a single coin.

Other objects sought by us are set forth in the description, and claims.

In applying this device we have used scales which are provided with a base, a standard and a head, the said base having therein a weighing frame mounted in the ordinary way on weighing levers, the said standard hollow and having therein a longitudinally movable rod and the said head having a scale beam with two members exposed to view, mounted in the ordinary way and provided with sliding weights; the said longitudinally movable rod connected at its lower end to the weighing levers and at its upper end to the scale beam in the ordinary way, to transmit motion of the weighing frame which is mounted on the levers to the scale beam.

Figure 6:
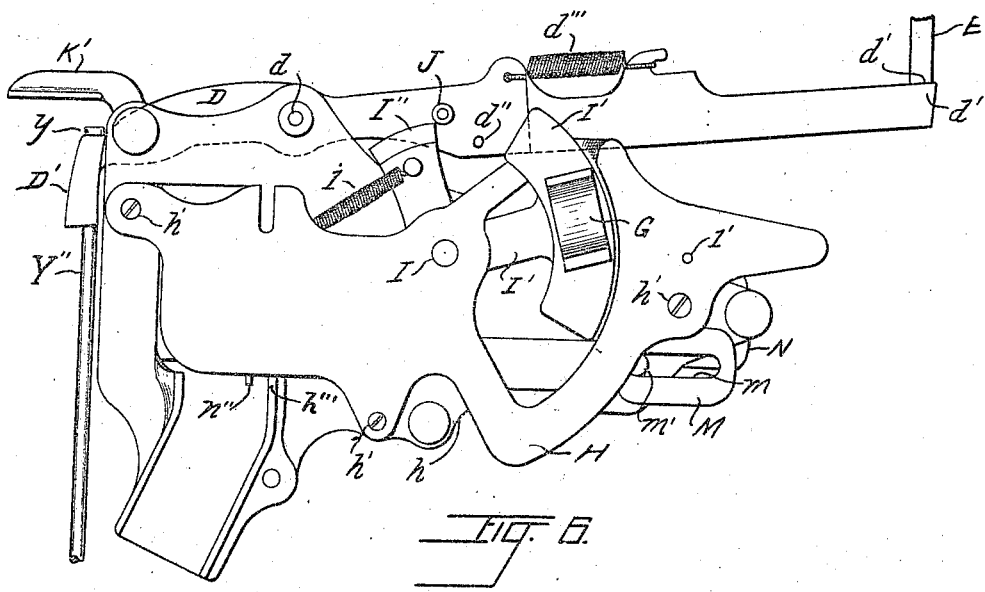
Figure 7:
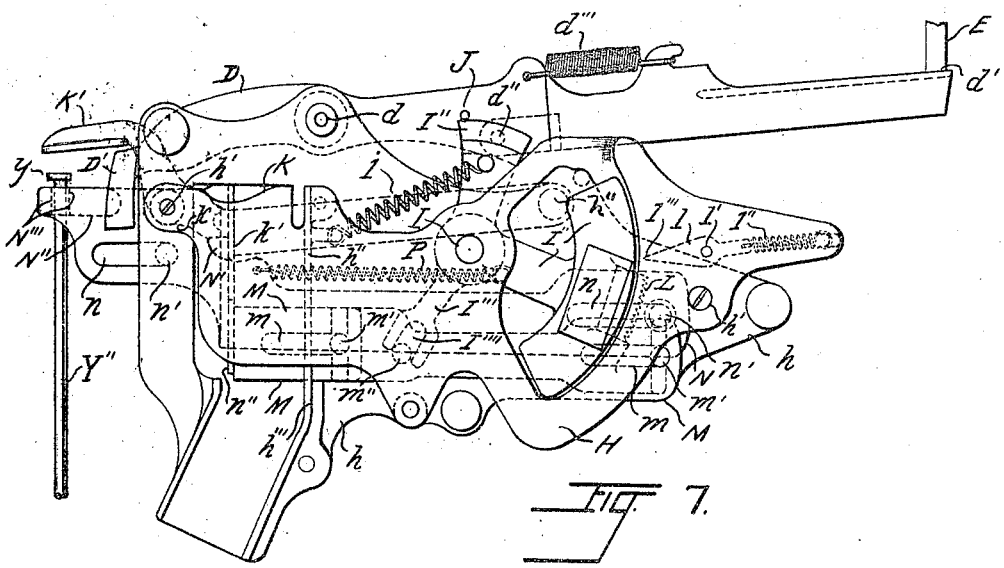
Figure 8:
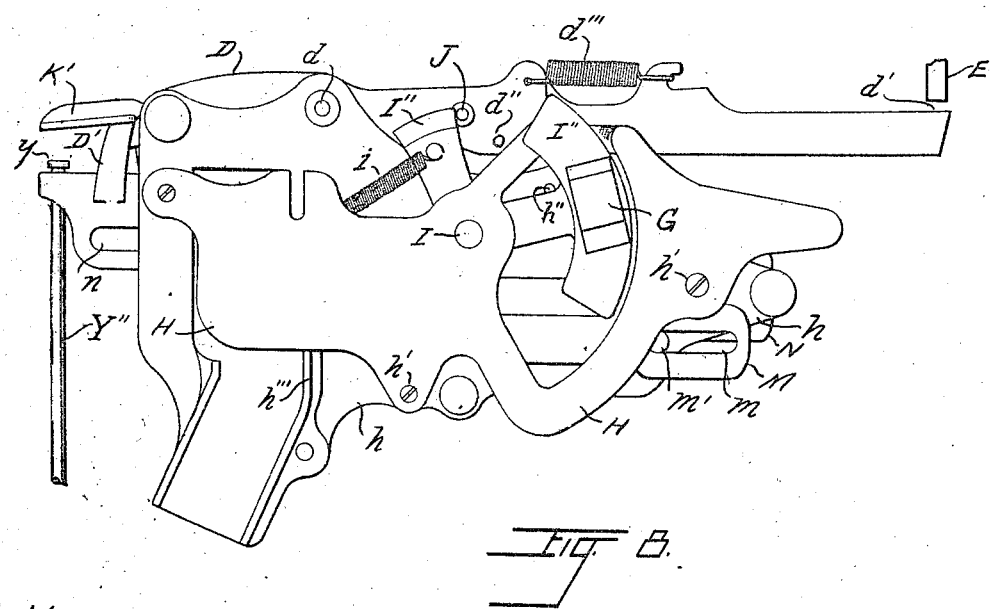

In the drawings referred to Figure 1 is a perspective of a weighing scales with the device embodying our invention applied thereto. Fig. 2 is a front elevation of the head of the weighing scales having our device applied thereto, with a portion of the front face of said head removed to expose to view the portion of the device embodying our invention which is located in said head. Fig. 3 is an edge view of a plate which is attached to the head of the scales and of a vertically movable rod mounted on said plate, showing a small portion of two of the members of the weighing beam in elevation. Fig. 4 is a front elevation of the plate and rod which are illustrated in Fig. 3, showing the two members of the scale beams in section. Fig. 5 is a front elevation of the portion of the mechanisms embodying our invention which are located in the head of the scales to which the device is applied, the movable parts of said mechanism being in their initial or normal position, with the scales not in use. Fig. 6 is a front elevation of the several parts illustrated in Figs. 2 and 5, with the movable parts moved into a determined position by a person or thing on the weighing platform of the scales prior to or after the deposit of a coin in the slot of the device, but prior to the depression of the thumb piece of the device. Fig. 7 is a front elevation of the mechanism illustrated in Figs. 2, 3 and 4, with the movable parts thereof moved into a determined position by a person or thing on the weighing platform of the scales subsequent to the deposit of a coin in the slot of the device and with the thumb lever of the device depressed. Fig. 8 is a front elevation of the mechanism illustrated in Figs. 2, 3, 4, and 5, with the movable parts thereof moved into the determined position illustrated in Fig. 7, by a person or thing on the weighing platform of the scales subsequent to the deposit of a coin in the slot of the device, the depression of the thumb lever, and the release of said thumb lever and its return to its initial position. Fig. 9 is a rear elevation of the mechanism illustrated in Figs. 2, 5, 6, 7, and 8, with the movable parts thereof in the same position as is illustrated in Fig. 5. Figs. 3 to 9 both inclusive, are on an enlarged scale from Figs. 1, 2.

Similar letters refer to similar parts throughout the several views.

X is the base, Y the standard and Z the head of the scales to which we have applied our invention.

Y' is the connection joined at its lower end to the weighing lever of the scales and at its upper end (see Fig. 2), to the weighing beam.

Z', Z'', Z''', are members of the weighing beam, and are provided with sliding weights in the ordinary way.

The connection Y' is the ordinary connection between the weighing levers of a scales and the weighing beam thereof and the weighing beam, mounted as shown and provided with members Z', Z'', Z''' is well known and forms no part of our invention. As no change is required or made by us in the mounting of these parts of a scales we can apply the device embodying our invention to any weighing scales of the type illustrated.

As we do not desire the scales to which our device is applied to be adjusted (for accuracy) by the person using the same, we mount the adjusting screw Z'''' on member Z'' of the weighing beam so that it is rotatable, (see Fig. 2), and non-rotatably mount the adjusting weight Z''''' on said member Z'', and on said screw Z''''. Screw Z'''' is not movable longitudinally, while weight Z''''' is movable longitudinally. Turning the screw Z'''', therefore, slides the weight Z''''' to accurately adjust the scales.

D is a two part lever pivoted or fulcrumed at d. Part or end d' is pivotally attached to the pivoted part by pin d''.

d''' is a spring yieldingly holding the two parts of the lever in a determined relative position.

D' is the end of lever D opposite to end d'.

The rod Y'' is connected at its lower end to the platform A of the scales to which our device is attached so as to be moved down by the downward movement of said platform, and at its upper end said rod Y'' is detachably connected to end D' of lever D so that said end D' is moved down by the downward movements of rod Y'', when said parts are connected. The operation of the lever D occurs without reference to the deposit of a coin in slot F, by the downward movement of rod Y'', to have the end thereof with which the upper end of said rod is shown in engagement in Figs. 2, 5, 6, and 9, moved down, (thereby turning said lever D on its fulcrum d and moving the end d' thereof up).

E is a longitudinally movable rod, having its upper end E' in a horizontal plane, which is longitudinally movable in bearings e, e', on plate E'' (see Fig. 3). The upper end E' of connection E is in a horizontal plane to extend under member Z''' of the weighing beam and rests on bearing e'' when in its lowest position, so that said rod E is not at such time supported by end d' of lever D. When platform A is in its normal position the weighing beam is balanced but may be closed to end E' of rod E, as is illustrated in Figs. 3 and 4. When the end d' of lever D is moved up, in the manner hereinbefore described, the free ends of all the members of the weighing beam are moved up, and said weighing beam, so long as the free ends of the members thereof are held in this raised position by rod E is inoperative to record or register any weight of the person or thing on the platform A.

As the weighing beam of the scales is open to a person operating the device and scales, (for the purpose of sliding the weights on members Z'' and Z''' on the weighing beam, to obtain the correct weight of said person or thing) the free end of said weighing beam may, when raised by rod E with a person standing on platform A, be forced down manually and it is to avoid breakage or injury to any part of the device or scales in case said free end of the weighing beam is forced down, that the lever D is made in two parts. Spring d'''' is of sufficient strength to hold the part d' of said lever D in its determined position relative to the fulcrumed part of said lever but yields to permit the end d' to be forced down by the forcing down of the free end of the weighing beam.

The recording or registration of the weight of a person or thing on platform A being prevented by the above described movement of lever D, so long as the weighing beam is held up by said lever, the invention sought to be included within the terms of the claims forming a part hereof is embodied in said lever and the mechanisms (about to be described), whereby the connection Y'' is disengaged from end D' thereof, upon the performing of certain determined operations by the person who desires to obtain the record or register of a weighing. The operations required are, the deposit of a coin in slot F, (see Fig. 1), the subsequent forcing down of the thumb piece G a predetermined distance, and the release and return of said thumb piece to its initial position.

The mechanisms which are operated upon the deposit of a coin in slot F and the subsequent forcing of thumb piece G down and its return to its initial position, are illustrated in Figs. 2, 5, 6, 7, 8, and 9, with the several elements thereof in the several positions they are forced to assume thereby. H, Figs. 2, 5, 6, 7, and 9, is the front plate of the frame of the mechanisms which are placed in head Z, and h, Figs. 2, 5, 6, 7, 8, and 9 is the back plate of said frame. h' are posts connecting plates H, h, together. h'' Figs. 5, 7, 8, and 9, is a post on the back of plate h. h''' is a plate attached to plate h at right angles thereto. The thumb piece G is rigidly secured on the arm I' of hub I and said hub is pivotally mounted at its ends in plates H, h. Hub I is provided with arms I'' and I'''. Arms I', I'', and I''' are by us made integral with the hub I. i is a spring attached at one end to plate h''' and at the other end to arm I' yieldingly holding the hub I and arms I', I'', and I''' in their initial position and returning them to their initial position when thumb piece G is released after being depressed. The arm I''' is provided with slot I''''. J is a projection or lug on the lever D. K is a lever pivotally mounted on post h''. K' is the free end of lever K, which is raised by connection Y'' on the return of said connection to its initial position, (on the return of the platform A to its initial or normal position when the person or thing which has been thereon steps off or is removed from said platform): k is a horizontal underside or face of lever K near the end K' of said lever and k' is a shoulder on the under side of lever K adjacent to table k. The position of the end y of the rod or connection Y'' relative to end D' of lever D and of end K' of lever K, when the scales and the mechanisms in head Z are in their normal position, (with no person or other thing on the platform A of the scales,) is illustrated in Figs. 2, 5, and 8. When the several parts of the mechanisms in the head are in their normal position the projection or lug J on lever d, is in the path of movement of the arm I'' of hub I, and the thumb piece G cannot be moved from its normal position. The mechanisms in said head Z are at such time inoperative. When a person steps on the platform A or places a load thereon, the connection Y'' is moved longitudinally down, as hereinbefore explained, and the end y of said connection moves the end D' of lever D down, turning said lever on its pivot d', from the position in which said lever is illustrated in Figs. 2 and 5, into the position in which said lever is illustrated in Fig. 6; the lever D moves rod E up, and in addition to moving the connection E and the scale beam up, as hereinbefore described, said movement of lever D moves projection J thereon out of the path of movement of the arm I'' of hub I, and the thumb piece G may be depressed. The end of arm I' is provided with ratchet teeth L (see Figs. 5, 7, and 9) and l is a dog which is pivotally mounted on plate H at l' and which is yieldingly held in the position in which it is illustrated in said figures by the spring l''. Dog L is positioned so that the end l''' thereof is in engagement with the teeth L as arm I' moves down and also as said arm returns to its initial position, to prevent movement of said arm (and hub I), in the opposite direction until the predetermined movement thereof is made. The depression of thumb piece G and its return to its initial position after the predetermined distance of travel is obtained, may be made by a person on the platform A, as well before a deposit of a coin in the slot F as after such deposit; but when said depression and return occur before the deposit of a coin the position of lever D is not affected thereby, and no record or register of the weight of the person on said platform can be obtained. To obtain the return of the lever D to its initial and normal position upon the depression of the thumb piece G and its return to its normal position, and while a person remains standing on the platform A, (with longitudinally movable connection Y'' down), we provide the following elements. Longitudinally movable bar or bolt M which is provided with slots m, m, and projections m'', m''', and mounted on the front face of plate h by projections m', m', (which we make integral with said plate) the said projections extending into the slots m, and the length of said slots permitting the determined length of travel of said bolt. Longitudinal movement of bolt N is obtained by the projection m'' on said bolt M being positioned in the recess I'''' at the lower end of arm I'''. Sliding bar N, which is provided with slots n, n, and is mounted on the plate h by the projections n', n', (which we also make integral with the plate h on the back face thereof) which extend into the slots n, n. The sliding bar N is also provided with the projection N' and head N''. Head N'' extends back of the back face of bar N, into the place of lever K, see Fig. 9. The free end K' of bar K is supported in a raised position by the horizontal table k resting on the head N''. The ends of table k and projection N'' are rounded whereby the ends which come in contact on the return of bar N to its initial position; so as to easily engage and permit said projection N'' to raise the end K' of said lever K. Head N'' is provided with a vertical slot (indicated by broken lines N''') Figs. 5, 7, and 9. n'' is a plate which is rigidly secured to said sliding bar N in position to lie in a plane parallel to the front face of plate h''' and at a suitable distance therefrom to obtain a runway between it and the said plate h''' for coin inserted in the slot F. O, Fig. 5, is a coin from falling below the plate h''' which is secured rigidly to extend into the coin runway a sufficient distance to prevent a coin from falling below the plates $h'''$ and $n''$ when said plate $n''$ is in its initial position. The plate $n''$ is provided with a slot or recess into which the forward end of the bolt M moves when no coin is in the runway between the plates $h'''$, $n''$, and in front of the said recess. The upper end of the connection $Y''$ is extended through the vertical aperture, in head $N'''$, fitting loosely therein.

When a person is standing on the platform A with the lever D in the position illustrated in Fig. 5, and a coin is deposited in slot F, the depression of the thumb piece G moves the lower end of arm $I'''$ to the left, (as viewed in Fig. 5), and the coin is forced against the plate $n''$ forcing said coin and plate to the left. The coin is carried off of the projection O, and the end $y$ of connection $Y''$ is carried to the left and off from the end $D'$ of lever D, at such time the end of arm $I''$ will be underneath the projection J, as in Fig. 7 and said lever D is maintained in its raised position by said projection resting on the said upper end of the arm $I''$. The rear end of the head $N''$ on sliding bar N is moved by the movement of said bar, out from under the end $K'$ of lever K, allowing said lever to drop into position with the shoulder $k'$ thereon back of the projection $N'$ on bar N, and said bar is thereby prevented from returning to its initial and normal position, (see Fig. 7). The spring $i$ is extended, and the several parts are in the position which is illustrated in Fig. 7. With the several parts last above described in the position illustrated in Fig. 7 the thumb piece may be allowed to return to its initial and normal position, and it will be so returned, if released, by spring $i$. On the return of the thumb piece to the position thereof which is illustrated in Fig. 8 the end of arm $I''$ which is shown in Fig. 7 under projection J is moved to the left, as viewed in said figure and out from under said projection J as shown in Fig. 8 and the lever D may, and will, drop by gravity to its initial position, with said projection in front of arm $I''$. With the several elements of said mechanism in the position illustrated in Fig. 3 the person standing on the platform A may move the sliding weights on beam members $Z''$ and $Z'''$ of the weighing beam to indicate the exact weight which is on said platform. While the person remains standing on said platform the lever K will continue to hold bar N in its forward or advanced position, (by the shoulder $k'$ being back of lug $N'$), but on said person stepping off the platform the connection $Y''$ will move upward and the end $y$ striking the underneath side of end $K'$ of lever K, will raise said end $K'$ to release the shoulder $k'$ and projection $N'$ from engagement, whereupon the bar N will be returned to its normal position by spring P, and the several parts will be in the position thereof which is illustrated in Figs. 2 and 5, and the device is in position to be again used, as before.

We claim:—

1. In a coin controlled mechanism, a frame provided with a coin runway, in combination with a lever fulcrumed in the frame, a means detachably connected thereto to depress one end of said lever from its normal position, a connection between the other end of said lever and the weighing beam of a scale, an additional lever pivotally mounted in the frame, means to move said additional lever on its pivot bars, a connection between one of the bars and the additional lever, the other bar arranged when moved to detach therefrom the detachable connection of said fulcrumed lever, the arrangement between said bars being such that when a coin is in the runway movement of the bar which is connected to the additional lever moves the remaining bar and detaches the longitudinally movable rod from said fulcrumed lever.

2. In a coin controlled mechanism, a frame provided with a coin runway, in combination with a lever fulcrumed in the frame, a longitudinally movable rod arranged to depress one end of said lever from its normal position, a connection between the other end of said lever and the weighing beam of a scale, an additional lever pivotally mounted in the frame, means to move said additional lever on its pivot bars, a connection between one of the bars and the additional lever, the other bar arranged when moved to detach the longitudinally movable rod from said fulcrumed lever, the arrangement between said bars being such that when a coin is in the runway movement of the bar which is connected to the additional lever moves the remaining bar and detaches the longitudinally movable rod from said fulcrumed lever.

3. In a coin controlled mechanism, a frame provided with a coin runway, in combination with a lever fulcrumed in the frame, a longitudinally movable rod arranged to depress one end of said lever from its normal position, a connection between the other end of said lever and the weighing beam of a scale, an additional lever pivotally mounted in the frame, means to move said additional lever on its pivot bars, a connection between one of the bars and the additional lever, the other bar arranged when moved to detach the longitudinally movable rod from said fulcrumed lever, a projection on the fulcrumed lever and a projection on the additional lever, said projections engaging to prevent movement of the additional lever when the fulcrumed lever is in its normal position, the arrangement between said bars being such that when a coin is in the runway movement of the bar which is connected to the additional lever moves the remaining bar and detaches the longitudinally movable rod from said fulcrumed lever.

4. In a coin controlled mechanism a frame provided with a coin runway, in combination with a lever fulcrumed in the frame, a projection on the lever, a rod detachably connected to the lever to move one end thereof down from its normal position, a connection between the other end of said lever and the weighing beam of a scale, bars longitudinally movable in the frame, an additional lever, movably mounted in the frame, a projection on said additional lever, the projection on the fulcrumed lever positioned in the path of movement of the projection on the additional lever when said fulcrumed lever is in its normal position, a connection between one of the bars and the additional lever, the other bar arranged when moved to detach the rod from said first named lever, the arrangement between said bars being such that when a coin is in the runway movement of the bar connected to the additional lever moves the remaining bar and detaches said rod from said fulcrumed lever.

5. In a coin controlled mechanism a frame provided with a coin runway, in combination with a lever fulcrumed in the frame, a projection on the lever, a rod detachably connected to the lever to move one end thereof down from its normal position, a connection between the other end of said lever and the weighing beam of a scale, bars longitudinally movable in the frame, an additional lever movably mounted in the frame, a projection on said additional lever, the projection on the fulcrumed lever positioned in the path of movement of the projection on the additional lever when said fulcrumed lever is in its normal position, and when both said levers are moved from their initial position, said projection on the additional lever in the path of the projection on the fulcrumed lever and preventing the return of the fulcrumed lever to its normal position until after the return of the additional lever to its normal position, a connection between one of the bars and the additional lever, the other bar arranged when moved to detach the rod from said first named lever, the arrangement between said bars being such that when a coin is in the runway movement of the bar connected to the additional lever moves the remaining bar and detaches said rod from said fulcrumed lever.

6. In a coin controlled mechanism a frame provided with a coin runway, in combination with a two part lever fulcrumed in the frame, one of said parts pivotally attached to the other and means to yieldingly hold said parts in a determined relation to each other, a projection on the lever, a rod detachably connected to the lever to move one end thereof down from its normal position, a connection between the other end of said lever and the weighing beam of a scale, bars longitudinally movable in the frame, an additional lever, movably mounted in the frame, means to yieldingly hold said additional lever in its initial position, a projection on said additional lever, the projection on the fulcrumed lever positioned in the path of movement of the projection on the additional lever when said fulcrumed lever is in its normal position, a connection between one of the bars and the additional lever, the other bar arranged when moved to detach the rod from said first named lever, the arrangement between said bars being such that when a coin is in the runway movement of the bar connected to the additional lever moves the remaining bar and detaches said rod from said fulcrumed lever.

7. In a coin controlled mechanism a frame provided with a coin runway, in combination with a two part lever fulcrumed in the frame, one of said parts pivotally attached to the other and means to yieldingly hold said parts in a determined relation to each other, a projection on the lever, a rod detachably connected to the lever to move one end thereof down from its normal position, a connection between the other end of said lever and the weighing beam of a scale, bars longitudinally movable in the frame, an additional lever movably mounted in the frame, means to yieldingly hold said additional lever in its initial position, a projection on said additional lever, the projection on the fulcrumed lever positioned in the path of movement of the projection on the additional lever when said fulcrumed lever is in its normal position, and when both said levers are moved from their initial position, said projection on the additional lever in the path of the projection on the fulcrumed lever and preventing the return of the fulcrumed lever to its normal position until after the return of the additional lever to its normal position, a connection between one of the bars and the additional lever, the other bar arranged when moved to detach the rod from said first named lever, the arrangement between said bars being such that when a coin is in the runway movement of the bar connected to the additional lever moves the remaining bar and detaches said rod from said fulcrumed lever.

8. A coin controlled mechanism consisting of a frame, a lever fulcrumed in the frame, said lever consisting of two parts, one of said parts movably attached to the other part, and a spring attached at its ends to said parts to yieldingly hold said parts in a determined position relative to each other, a projection on said lever, longitudinally movable bars so related that when a coin is interposed between them movement of one bar moves the other, and when a coin is not interposed movement of one bar does not move the other, a hub pivotally mounted in the frame, arms to said hub, one of said arms provided with a thumb piece, one of said arms positioned to engage with the projection on said lever when said lever is in its normal position to lock the arm and hub from turning and said arm also arranged to engage said projection to prevent the return of said two part lever from returning to its normal position when said arm and hub are not in their initial position, and the remaining arm connected to one of the longitudinally movable bars, means detachably connected to the two part lever to move the said lever from its normal position to permit movement of the thumb piece and hub.

9. A coin controlled mechanism consisting of a frame, a lever fulcrumed in the frame, said lever consisting of two parts, one of said parts movably attached to the other part, and a spring attached at its ends to said parts to yieldingly hold said parts in a determined position relative to each other, a projection on said lever, longitudinally movable bars so related that when a coin is interposed between them movement of one bar moves the other, and when a coin is not interposed movement of one bar does not move the other, a hub pivotally mounted in the frame, arms to said hub, one of said arms provided with a thumb piece, one of said arms positioned to engage with the projection on said lever when said lever is in its normal position to lock the arm and hub from turning and said arm also arranged to engage said projection to prevent the return of said two part lever from returning to its normal position when said arm and hub are not in their initial position, and the remaining arm connected to one of the longitudinally movable bars, means detachably connected to the two part lever to move the said lever from its normal position to permit movement of the thumb piece and hub, and means to prevent movement of said hub in the opposite direction until the determined travel of the arms on said hub in a given direction is obtained.

10. A coin controlled mechanism consisting of a frame, a lever fulcrumed in the frame, said lever consisting of two parts, one of said parts movably attached to the other part, and a spring attached at its ends to said parts to yieldingly hold said parts in a determined position relative to each other, a projection on said lever, longitudinally movable bars so related that when a coin is interposed between them movement of one bar moves the other, and when a coin is not interposed movement of one bar does not move the other, a hub pivotally mounted in the frame, arms to said hub, one of said arms provided with a thumb piece, one of said arms positioned to engage with the projection on said lever when said lever is in its normal position to lock the arm and hub from turning and the remaining arm connected to one of the longitudinally movable bars, means detachably connected to the two part lever to move the said lever from its normal position to permit movement of the thumb piece and hub.

JOSEPH PAUPA.
GUSTAV F. HOCHRIEM.

In presence of—
CHARLES TURNER BROWN,
CORA A. ADAMS.